(12) United States Patent
Kandrasheu et al.

(10) Patent No.: US 8,898,472 B2
(45) Date of Patent: Nov. 25, 2014

(54) MECHANISM AND METHOD FOR MANAGING CREDENTIALS ON IOS BASED OPERATING SYSTEM

(75) Inventors: Yauheni Kandrasheu, Toronto (CA); Sarah Happe, Pickering (CA); Christian Peel, Aurora (CA)

(73) Assignee: Echoworx Corporation, Toronto (CA)

( * ) Notice: Subject to any disclaimer, the term of this patent is extended or adjusted under 35 U.S.C. 154(b) by 124 days.

(21) Appl. No.: 13/185,042

(22) Filed: Jul. 18, 2011

(65) Prior Publication Data

US 2013/0024695 A1 Jan. 24, 2013

(51) Int. Cl.
H04L 9/32 (2006.01)
(52) U.S. Cl.
USPC ....................................................... 713/175
(58) Field of Classification Search
None
See application file for complete search history.

(56) References Cited

U.S. PATENT DOCUMENTS

| | | | | |
|---|---|---|---|---|
| 2002/0116610 | A1* | 8/2002 | Holmes et al. | 713/156 |
| 2003/0221104 | A1* | 11/2003 | Baessler | 713/175 |
| 2006/0047962 | A1* | 3/2006 | Adams et al. | 713/175 |
| 2006/0059350 | A1* | 3/2006 | Cantwell et al. | 713/176 |
| 2007/0234043 | A1* | 10/2007 | Miyazawa | 713/156 |
| 2008/0307020 | A1* | 12/2008 | Ko et al. | 707/204 |
| 2011/0167474 | A1* | 7/2011 | Sinha et al. | 726/1 |

* cited by examiner

Primary Examiner — David Le
(74) Attorney, Agent, or Firm — Bennett Jones LLP

(57) ABSTRACT

A mechanism and method for managing credentials on an electronic device configured with an iOS based operating system. The iOS based device includes a "keychain" configured in device memory. According to an embodiment, the electronic device comprises an application configured to generate a public certificate object in the keychain and a password object in the keychain. The public certificate object is configured to store a public certificate, and the password object is configured to store a private key. The password object further includes a label or thumbprint for associating the private key with the corresponding public certificate. According to an embodiment, the application stores the private key in an encrypted container in the password object to provide an additional layer of security. The application is configured to unlock the encrypted container utilizing a password provided the user. According to a further aspect, the user password is not stored in memory on the device. According to an embodiment, the private key is generated and provided by a credential management system operatively coupled to the electronic device for digitally signing an email message.

14 Claims, 2 Drawing Sheets

MECHANISM AND METHOD FOR MANAGING CREDENTIALS ON IOS BASED OPERATING SYSTEM

FIELD OF THE INVENTION

This invention relates to electronic devices, and more particularly to a mechanism and method for managing credentials on an electronic device configured with an iOS based operating system.

BACKGROUND OF THE INVENTION iOS (known as the iPhone™ Operating System) is a mobile operating system from Apple Inc. The iOS operating system was originally developed for the iPhone™ device. It has since been extended to other Apple devices such as the iPod™ touch device and the iPad™ tablet.

Within the iOS operating system, there is no secure way to protect a credential or a private key, for example, a private key in a RSA (Rivest, Shamir and Adleman) based public-key cryptography system such as PKI (Public Key Infrastructure). The iOS operating system includes a container called a "keychain" for storing passwords and the like. While the iOS operating system provides password protection (i.e. utilizing the Keychain container) and limited file encryption, the security of an iOS based system is vulnerable to attack. Once an iOS based device is compromised then any user passwords and credentials, such as RSA private keys, are also compromised.

Accordingly, there remains a need for improvement in the art.

BRIEF SUMMARY OF THE INVENTION

The present invention is directed to a mechanism and method for managing credentials on an electronic device with an iOS based operating system.

According to an embodiment, the present invention comprises a mechanism for managing a user credential in an electronic device configured for an iOS operating system including a keychain, the mechanism comprises: a certificate object under the iOS keychain, the certificate object being configured to store a certificate; a password object under the iOS keychain, the password object being configured to store a private key; the password object being configured to store a thumbprint, the thumbprint being configured to associate the private key with a corresponding certificate.

According to another embodiment, the present invention comprises a communication device comprising an iOS operating system and including a keychain, the communication device comprises: an email module configured to receive email messages intended for a user of the communication device and to transmit email messages to a recipient; an application module configured to manage a certificate and a private key associated with the user; the application module being configured to store the certificate in a certificate object under the keychain and to store the private key in a password object under the keychain; the application module being configured to generate a thumbprint and store the thumbprint in the password object, and the thumbprint being configured to associate the private key stored in the password object with the corresponding certificate in the certificate object; the application module being configured to digitally sign an email message using the private key prior to the email message being transmitted to the recipient.

According to a further embodiment, the present invention comprises a method for managing credentials for a user on a communication device comprising an iOS operating system with a keychain, the method comprises the steps of: providing a certificate object under the keychain, and storing a certificate in the certificate object; providing a password object under the keychain, and the password object comprising an encrypted container configured for storing a private key; providing a thumbprint and storing the thumbprint in the password object, the thumbprint being configured to link the private key to the associated certificate; and securing the encrypted container with a password associated with the user.

According to another embodiment, the present invention comprises a method for digitally signing an email message generated by a user of a communication device and the device including an iOS based operating system having an iOS keychain, the method comprises the steps of: inputting an encrypted container from a password object under the keychain in the iOS operating system, the encrypted container containing a private key associated with the user; inputting a thumbprint from the password object corresponding to the private key; using the thumbprint to search a certificate associated with the private key; inputting the associated certificate from a certificate object, the certificate object being under the keychain in the iOS operating system; prompting the user to provide a password, and if correct, using the password to decrypt the encrypted container and retrieve the private key, and storing the private key in memory for the communication device; utilizing the private key to digitally sign the email message; and deleting the decrypted private key from the memory of the communication device.

According to another embodiment, the present invention comprises a method for decrypting an encrypted email message intended for a user and received at a communication device configured with an email application and comprising an iOS operating system with a keychain configured in memory of the communication device, the method comprises the steps of: inputting an encrypted container from a password object under the keychain in the iOS operating system, the encrypted container containing a private key associated with the user; inputting a thumbprint from the password object corresponding to the private key; using the thumbprint to search a certificate associated with the private key; inputting the associated certificate from a certificate object, the certificate object being under the keychain in the iOS operating system; prompting the user to provide a password, and if correct, using the password to decrypt the encrypted container and retrieve the private key and storing the private key in the device memory; using the private key and the associated certificate in a decryption operation to decrypt the email message; making the decrypted email message available in an inbox associated with the email application; and deleting the private key from the device memory.

Other aspects and features of the present invention will become apparent to those ordinarily skilled in the art upon review of the following exemplary embodiments of the invention in conjunction with the accompanying figures.

BRIEF DESCRIPTION OF THE DRAWINGS

Reference will now be made to the accompanying drawings, which show by way of example, embodiments according to the present invention, and in which.

Like reference numerals indicate like elements or components in the drawings.

DETAILED DESCRIPTION OF THE EMBODIMENTS

Figure 1:
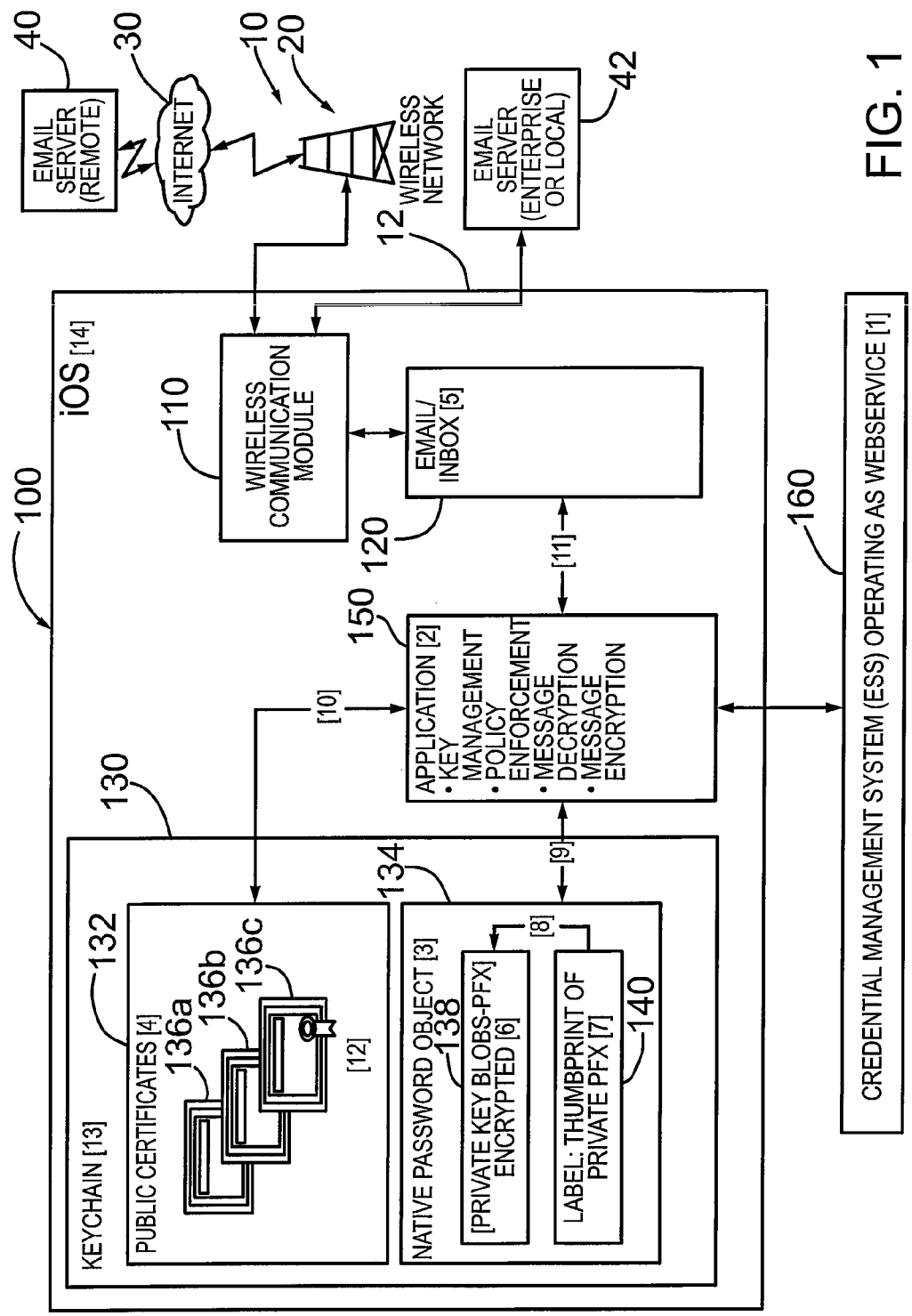
FIG. 1 shows in diagrammatic form an exemplary system suitable for practising an embodiment according to the present invention.

Reference is made to FIG. 1, which shows in diagrammatic form an exemplary system incorporating a mechanism and method for managing credentials according to an embodiment of the invention. In the present description, the mechanism and method is described in the context of an electronic device, or an electronic device configured with a communication capability or facility, running or based on the iOS operating system from Apple Inc. It will however be appreciated that the mechanism and/or method is suitable in part, or whole, in other operating systems or applications comprising a similar security structure or facility.

In FIG. 1, the communication device is indicated generally by reference 100 and can comprise an iPhone™ handheld device from Apple Inc., or an iPOD™ device or an iPAD™ device, also from Apple Inc. The device 100 is operatively coupled to a communication network 10 and configured to transmit and receive email messages and other types of data and/or voice communications. According to an embodiment, the communication network 10 comprises a wide area wireless network, for example, a cellular network, comprising a plurality of transceivers and repeaters, indicated generally by reference 20 in FIG. 1. According to an embodiment, the communication network 10 provides Internet access indicated generally by reference 30. One or more email servers (e.g. remote servers) indicated generally by reference 40 are operatively to the communication network 10 either through the Internet 30 or directly through the transceiver 20. According to another exemplary implementation, the device 10 is operatively coupled to a local area network or LAN, for example, a wireless LAN (WLAN), WI-Fi or Bluetooth based connection, indicated generally by reference 12. One or more email servers indicated generally by reference 42 are operatively coupled to the wireless WLAN 12. In known manner, the communication networks 10 or 12 provide the capability for the device 100 to transmit and receive email messages and other types of messages or data communications from the remote or local remote servers 40, 42, for example, configured as email servers.

As shown in FIG. 1, the device 100 is configured to run the iOS operating system and comprises a wireless communication module or interface indicated generally by reference 110. The wireless communication module 110 is implemented and configured in known manner, and provides the capability for the device 100 to interface with the communication networks 10 and 12 as described above. The device 100 includes an email module or client or application indicated generally by reference 120. The email module 120 is configured in known manner to provide the capability or facility to compose, transmit, receive and otherwise manage email communications and other types of communications or data messages. The email module 120 in an exemplary implementation includes an encryption facility or module configured to encrypt email messages and/or attachments (e.g. S/MIME messages) using PKI (Public Key Infrastructure, e.g. a public certificate and key). The email module 120 in an exemplary implementation can further include a decryption facility or module configured to decrypt email messages and/or attachments (e.g. S/MIME messages using PKI). Based on the iOS implementation, the device 100 includes a keychain indicated generally by reference 130. The keychain 130 is configured under the iOS operating system to provide a secure depository for storing user information, credentials, such as passwords, etc.

In accordance with an embodiment of the present invention, the device 100 is configured with a secure communication application indicated generally by reference 150. According to an exemplary embodiment, the device 100 and application 150 are configured to function with a SasS based credential management system such as the ESS system available from Echoworx Corporation in Toronto, Ontario, CANADA, and indicated generally by reference 160 in FIG. 1. According to an exemplary embodiment, the credential management system 160 is configured to operate as a Web-based service. The application 150 is configured to provide the associated security functions, such as, key management, policy enforcement, message encryption and decryption, as will be described in more detail below.

Referring again to FIG. 1, the keychain 130 is configured with a public certificates object 132 and a native password object 134 in accordance with an embodiment of the present invention. According to one aspect, the public certificates object 132 are configured to store or hold one or more public certificates 136, indicated individually by references 136a, 136b and 136c in FIG. 1. In the context of one embodiment, the public certificates 136 are imported as native "certificate" objects and do not require any additional security since they are not sensitive or secret. The public certificates 136 may comprise end-entities of a current user, end-entities of other users (people), certificates from a certificate authority, and/or an Echoworx Root. The Echoworx Root is obtained, for instance, from the Echoworx Credential Management System (ESS) 160. The native password object 134 is configured to a store private key associated with a user. According to an embodiment, the private keys are imported, or generated, as private key blobs (indicated generally by reference 138) and comprise PFX format data, where PFX is a type data format under the PKCS #12 standard, i.e. the Personal Information Exchange Syntax Standard. In known manner, the PKCS #12 standard comprises an Open SSL 40-bit RC2 encryption technique for certificates using triple DES encryption. According to an embodiment, each private key 138 comprises its own PFX file or key object. While the embodiment is described utilizing the PKCS standard, it will be appreciated and understood that other encryption methods can be supported in accordance with further embodiments or implementations.

According to a further aspect, the application 150 is configured to store a label or identifier 140 in the native password object 134. The label 140 is stored in the native password object 134 when the private key blob (i.e. the PFX data) 138 is stored in the native password object 134. According to an embodiment, the label 140 is configured to provide a "thumb-print" or identifier for the corresponding certificate 136 associated with the private key 138, and is further configured as a searchable data component or object recognizable by the application 150. The identifier 140 allows the public certificate 136 to be connected to the associated private key 138 when the keychain 132 (i.e. keystore) is being searched by the application 150 or another security utility or function. This also allows the private key 138 to be stored in encrypted form in the native password object 134 and thereby provide an additional layer of protection or security for the integrity of the private key.

The PFX standard is an industry standard file format for encrypting data. In the context of the present application, PFX encryption is used to store the private key(s) 134, and protection is provided with a password-based symmetric key. The application 150 can be configured according to an embodiment to enforce a password policy requiring the user to create a "strong" password. The password policy can, for example, comprise the application policy defined by the credential management system 160, for example, the ESS from Echoworx.

According to embodiment, the application 150 is configured with a process to decrypt an email message and/or attachment received with the email application 120 (i.e. in the Inbox) that is protected with the user's private key, i.e. the file has been digitally signed with user's private key 138. The application 150 is configured to perform the following method or process steps:

(1) the encrypted content, i.e. the encrypted email message and/or attachment received at the device 100, is parsed by the application 150 to determine a list of public certificates that were utilized to encrypt the file (2) the application 150 retrieves the matching public certificate 136 from the public certificates object 132 in the keychain 130

(3) the application 150 is configured to read or input the label or thumbprint 140 corresponding to the public certificate 136 retrieved from the public certificates object 132. As described above, the thumbprint 140 provides a mechanism for finding the associated private key, which is stored in the native password object 134 in encrypted form in a PFX container, i.e. a private key blob 138

(4) the application 150 is configured display a prompt or request that the user enter the device password or another user password (5) the application 150 uses the password from the user to generate a symmetric key that is used to decrypt the encrypted PFX private key, i.e. the encrypted PFX container containing the private key (6) if the user password is valid and/or correct, the application 150 unlocks, i.e. decrypts, the PFX container and the private key is retrieved and made available for use at the device 100, for example, by the application 150

(7) according to an embodiment, the application 150 can be configured to clear or delete the decrypted private key from device memory The processing steps and functions described herein can be implemented in the application 150 and executed by the operating system (i.e. the iOS) for the device 100 using programming techniques as will be within understanding of one skilled in the art.

According to embodiment, the application 150 is configured with a process to digitally sign an email message and/or attachment, i.e. a file, that is to be sent from the device 100. According to the embodiment, the application 150 is configured to perform the following method or process steps:

(1) the application 150 is configured to retrieve one of the public certificates 136 from the public certificate object 132 in the keychain 130, for example, utilizing a native iOS call (2) the application 150 then reads the label or thumbprint 140 associated with the public certificate 136

(3) the application 150 uses the thumbprint 140 to find the PFX container 138 which holds the associated private key (4) the application 150 is configured to prompt the user to enter a device password or a separate user password (5) if the user password is valid and/or correct, the application 150 unlocks, i.e. decrypts, the PFX container and the private key is retrieved and made available for use at the device 100 by the application 150 to digitally sign the email and/or attachment prior to sending to the intended recipient by the email application (6) according to an embodiment, the application 150 can be configured to clear or delete the decrypted private key from device memory after the encryption operation is completed The processing steps and functions described herein can be implemented in the application 150 and executed by the operating system (i.e. the iOS) for the device 100 using programming techniques as will be within understanding of one skilled in the art.

In accordance with an embodiment of the present invention, the device or user password is not cached or stored in the device 100. Instead, the user enters the password to authorize access to the encrypted private key, and then the private key is deleted from device memory.

According to embodiment for an iOS operating system implementation, the private keys are encrypted and stored in a container in a native password object in iOS keychain. The public certificate is stored in a public certificates object. According to another aspect, a label or thumbprint links the encrypted and otherwise unintelligible private key to the associated public key, thereby not making it obvious to an attacker how to find the private key that is associated with the public certificate.

Figure 2:
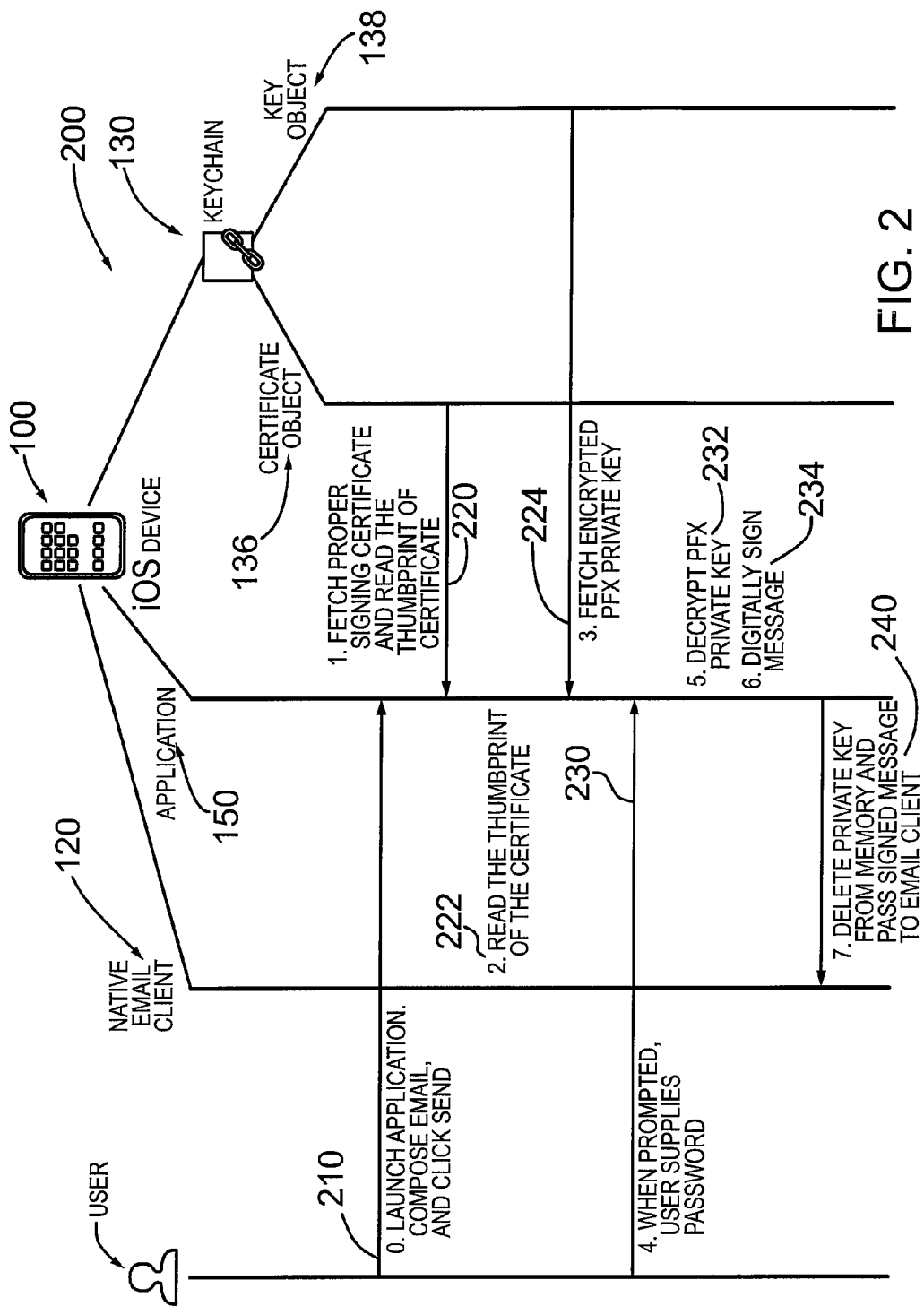
FIG. 2 is a flow-diagram showing a process for digitally signing a file according to an embodiment of the present invention.

Reference is next made to FIG. 2, which is a flow-diagram showing a process for digitally signing a file according to an embodiment of the present invention and indicated generally by reference 200. The first operation or step comprises a user launching the email application 120 running on the device 100 and composing an email message and "clicking" send, as indicated by reference 210. The application 150 is configured to retrieve, i.e. fetch, the proper signing certificate 136 from the certificate object 132 (FIG. 1) and determine the thumbprint 140 (FIG. 1) associated with the certificate 136, as indicated by reference 220 in FIG. 2. The application 150 reads the thumbprint in step 222 and fetches the corresponding key object 138 (i.e. the encrypted PFX container holding the private key) as indicated by reference 224 in FIG. 2. The application 150 is configured to prompt the user for a user password as indicated by step 230. The application 150 uses the user supplied password to decrypt the key object 138 and retrieve the private key, as indicted by reference 232. The application 150 utilizes the decrypted private key to digitally sign the file, i.e. the email message, as indicated by reference 234. The digitally signed message is then passed back to the email application or client 120 for transmission to the intended recipient. According to an embodiment, the application 150 is further configured to delete the decrypted private key from memory as also indicated in step 240.

In summary and according to an embodiment, there is provided a mechanism for managing a user credential in a communication device configured for iOS operating system including a keychain, the mechanism comprises: a certificate object under the iOS keychain, the certificate object being configured to store a certificate; a password object under the iOS keychain, the password object being configured to store a private key; the password object being configured to store a thumbprint, the thumbprint being configured to associate the private key with a corresponding certificate.

In summary and according to another embodiment, there is provided a communication device comprising an iOS operating system and including a keychain, the communication device comprises: an email module configured to receive email messages intended for a user of the communication device and to transmit email messages to a recipient; an application module configured to receive a certificate and a private key associated with the user; the application module being configured to store the certificate in a certificate object under the keychain and to store the private key in a password object under the keychain; the application module being configured to generate a thumbprint and store the thumbprint in the password object, and the thumbprint being configured to associate the private key stored in the password object with the corresponding certificate in the certificate object; the application module being configured to digitally sign an email message using the private key prior to transmitting the email message to the recipient; and the email module including a decryption facility configured to decrypt an encrypted email message received and intended for the user.

In summary and according to an embodiment there is provided a method for managing credentials for a user on a communication device comprising an iOS operating system with a keychain, the method comprises the steps of: providing a certificate object under the keychain, and storing a certificate in the certificate object; providing a password object under the keychain, and the password object comprising an encrypted container configured for storing a private key in the password object; providing a thumbprint and storing the thumbprint in the password object, the thumbprint being configured to link the private key to the associated certificate; and securing the encrypted contained with a password associated with the user.

In summary and according to an embodiment there is provided a method for encrypting an email message from a user of a communication device comprising an iOS operating system with a keychain, the method comprises the steps of: inputting an encrypted container from a password object under the keychain in the iOS operating system, the encrypted container containing a private key associated with the user; inputting a thumbprint from the password object corresponding to the private key; using the thumbprint to search a certificate associated with the private key; inputting the associated certificate from a certificate object, the certificate object being under the keychain in the iOS operating system; prompting the user to provide a password, and if correct, using the password to decrypt the encrypted container containing the private key and storing the private key in memory for the communication device; applying the private key to digitally sign the email message; and deleting the decrypted private key from the memory of the communication device.

In summary and according to another embodiment, there is provided a method for decrypting an encrypted email message intended for a user and received at a communication device configured with an email application and comprising an iOS operating system with a keychain configured in memory of the communication device, the method comprises the steps of: inputting an encrypted or secured container from a password object under the keychain in the iOS operating system, the encrypted container containing a private key associated with the user; inputting a thumbprint from the password object corresponding to the private key; using said thumbprint to search a certificate associated with the private key; inputting the associated certificate from a certificate object, the certificate object being under the keychain in the iOS operating system; prompting the user to provide a password, and if correct, using the password to decrypt the encrypted container containing the private key and storing the private key in the device memory; using the private key in a decryption operation to decrypt the email message; making the decrypted email message available in an inbox associated with the email application; and deleting the decrypted private key from the memory of the communication device.

The present invention may be embodied in other specific forms without departing from its spirit or essential characteristics. The embodiments described and disclosed are to be considered in all aspects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A mechanism for managing a user credential in a communication device configured for iOS operating system including a keychain, said mechanism comprising:
   a certificate object under the iOS keychain, said certificate object being configured to store a certificate;
   a password object under the iOS keychain, said password object being configured to store a private key, and comprising an encrypted container configured to store said private key and said encrypted container being secured by a user password;
   said password object being configured to store a thumbprint, said thumbprint being configured to associate said private key with a corresponding certificate and comprising a searchable object configured to be searchable under the iOS operating system for linking said encrypted container storing said private key with said associated certificate.

2. The mechanism as claimed in claim 1, wherein said user password is located independently of the communication device.

3. The mechanism as claimed in claim 1, wherein said encrypted container comprises a PFX container.

4. The mechanism as claimed in claim 1, wherein said private key or said certificate is provided from a credential management system.

5. A communication device comprising an iOS operating system and including a keychain, said communication device comprising:
   an email module configured to receive email messages intended for a user of the communication device and to transmit email messages to a recipient;
   an application module configured to receive a certificate and a private key associated with the user;
   said application module being configured to store said certificate in a certificate object under the keychain and to store said private key in a password object under the keychain, and said password object comprising an encrypted container configured to store said private key and said encrypted container being secured by a user password;
   said application module being configured to generate a thumbprint and store said thumbprint in said password object, and said thumbprint being configured to associate said private key stored in said password object with said corresponding certificate in said certificate object and comprising a searchable object configured to be searchable under the iOS operating system for linking said encrypted container storing said private key with said associated certificate;
   said application module being configured to digitally sign an email message using said private key prior to transmitting said email message to said recipient; and
   said email module including a decryption facility configured to decrypt an encrypted email message received and intended for the user, said encrypted email message being decrypted utilizing said private key and said certificate.

6. The communication device as claimed in claim 5, wherein said encrypted container comprises a PFX container.

7. The communication device as claimed in claim 5, wherein said certificate and said private key are provided from a credential management system.

8. A method for managing credentials for a user on an electronic device comprising an iOS operating system with a keychain, said method comprising the steps of:
 providing a certificate object under the keychain, and storing a certificate in said certificate object;
 providing a password object under the keychain, and said password object comprising an encrypted container configured for storing a private key in said password object;
 providing a thumbprint and storing said thumbprint in said password object, said thumbprint being configured to link said private key to said associated certificate and comprising a searchable object configured to be searchable under the iOS operating system for linking said encrypted container storing said private key with said associated certificate;
 securing said encrypted container with a password associated with the user.

9. The method as claimed in claim 8, wherein said certificate and/or said private key are provided by a credential management system operatively coupled to the communication device.

10. A method for encrypting an email message from a user on a communication device comprising an email utility and configured with an iOS operating system and including a keychain configured in memory of the communication device, said method comprising the steps of:
 inputting an encrypted container from a password object under the keychain in the iOS operating system, said encrypted container containing a private key associated with the user;
 inputting a thumbprint from said password object corresponding to said private key;
 using said thumbprint to search for a certificate associated with said private key, wherein said thumbprint comprises a searchable object configured to be searchable under the iOS operating system for linking said encrypted container storing said private key with said associated certificate;
 inputting said associated certificate from a certificate object, said certificate object being under the keychain in the iOS operating system;
 prompting the user to provide a password, and if correct, using said password to decrypt said encrypted container and retrieve said private key, and storing said retrieved private key in the device memory;
 using said private key to digitally sign the email message;
 making said email available to the email utility for transmission; and
 deleting the retrieved private key from the memory of the communication device.

11. The method as claimed in claim 10, wherein said private key is generated by a credential management system and downloaded to the communication device.

12. A method for decrypting an encrypted email message intended for a user and received at a communication device configured with an email application and comprising an iOS operating system with a keychain configured in memory of the communication device, said method comprising the steps of:
 inputting an encrypted container from a password object under the keychain in the iOS operating system, said encrypted container containing a private key associated with the user;
 inputting a thumbprint from said password object corresponding to said private key;
 using said thumbprint to search for a certificate associated with said private key, wherein said thumbprint is configured as a searchable object under the iOS operating system for linking said encrypted container storing said private key with said associated certificate;
 inputting said associated certificate from a certificate object, said certificate object being under the keychain in the iOS operating system;
 prompting the user to provide a password, and if correct, using said password to decrypt said encrypted container and retrieve said private key, and storing said private key in the device memory;
 using said private key and said certificate in a decryption operation to decrypt the email message;
 making said decrypted email message available in an inbox associated with the email application; and
 deleting the private key from the device memory.

13. The method as claimed in claim 12, wherein said private key is generated by a credential management system and downloaded to the communication device.

14. The method as claimed in claim 13, wherein said password is provided by the user independently of the communication device.

\* \* \* \* \*